US008589870B2

(12) United States Patent
Ogilvie et al.

(10) Patent No.: US 8,589,870 B2
(45) Date of Patent: Nov. 19, 2013

(54) SYSTEM AND METHOD FOR TRANSFORMING GRAPHICAL MODELS

(75) Inventors: Brian K. Ogilvie, Holliston, MA (US); Charles J. Devane, Upton, MA (US); Kiran Kumar Kintali, Natick, MA (US); Donald Paul Orofino, II, Sudbury, MA (US)

(73) Assignee: The Math Works, Inc., Natick, MA (US)

( * ) Notice: Subject to any disclaimer, the term of this patent is extended or adjusted under 35 U.S.C. 154(b) by 1333 days.

(21) Appl. No.: 11/879,322

(22) Filed: Jul. 17, 2007

(65) Prior Publication Data

US 2007/0261040 A1 Nov. 8, 2007

Related U.S. Application Data

(63) Continuation of application No. 11/231,387, filed on Sep. 20, 2005.

(51) Int. Cl.
*G06F 9/44* (2006.01)

(52) U.S. Cl.
USPC ............................. 717/109; 717/106; 717/113

(58) Field of Classification Search
USPC .......................................... 717/109, 106, 113
See application file for complete search history.

(56) References Cited

U.S. PATENT DOCUMENTS

| | | | |
|---|---|---|---|
| 6,883,147 | B1 | 4/2005 | Ballagh et al. |
| 7,103,526 | B2 | 9/2006 | Allen et al. |
| 7,162,710 | B1 * | 1/2007 | Edwards et al. ............... 717/111 |
| 7,197,743 | B2 | 3/2007 | Borg et al. |
| 7,260,501 | B2 | 8/2007 | Pattipatti et al. |
| 7,318,014 | B1 | 1/2008 | Molson et al. |
| 7,340,684 | B2 * | 3/2008 | Ramamoorthy et al. ..... 717/109 |
| 2002/0022905 | A1 | 2/2002 | Erlanoen et al. |

FOREIGN PATENT DOCUMENTS

EP 1387260 A1 2/2004

OTHER PUBLICATIONS

Leping, et al. "A Simulated Training System of Power Based on Interaction between C# Programs and Simulink", 2011, IEEE, p. 1-4.*
MathWorks, "Stateflow® and Stateflow® Coder, for Complex Logic and State Diagram Modeling, User's Guide, Version 5," The MathWorks, Inc. (2002).
Pohl, Zdenek et al., "Logarithmic Arithmetic for Real Data Types and Support for Matlab/Simulink Based Rapid-FPGA-Prototyping," *International Parallel and Distributed Processing Symposium* (2003).
Golin, Eric J. et al., "A Visual Design Environment," Proceedings of the 1993 IEEE/ACM international conference on Computer-aided design, Santa Clara, CA, pp. 364-367 (1993).
Written Opinion for Application No. PCT/US2006/036420, dated Jul. 2, 2007.
International Search Report for Application No. PCT/US2006/036420, dated Jul. 2, 2007.

* cited by examiner

*Primary Examiner* — Qamrun Nahar
(74) *Attorney, Agent, or Firm* — Nelson Mullins Riley & Scarborough LLP

(57) ABSTRACT

A modeling system includes a graphical programming environment that receives a first graphical model from a user. The system may also receive a configuration control set for the first graphical model. A code generation engine converts the first graphical model into an intermediate representation (IR). A second graphical model is created from the IR and the configuration control set. The second graphical model is displayed to the user, and may be subject to one or more modifications. Code in a target language may be generated from the second graphical model.

24 Claims, 6 Drawing Sheets

SYSTEM AND METHOD FOR TRANSFORMING GRAPHICAL MODELS

RELATED APPLICATION

The present application is a continuation of U.S. patent application Ser. No. 11/231,387, filed Sep. 20, 2005, entitled "System and Method for Transforming Graphical Models," which is related to a pending U.S. patent application Ser. No. 11/130,476, filed May 16, 2005, entitled "Extensible Internal Representation of Systems With Parallel and Sequential Implementations", the disclosure of which is incorporated by reference herein in its entirety.

FIELD OF THE INVENTION

The illustrative embodiment of the present invention relates generally to graphical models and more particularly to a system and method for utilizing intermediate representations of graphical models during graphical model design.

BACKGROUND

Real-life physical systems are frequently designed with the aid of graphical computer models. The designer attempts to design the graphical model so that it represents the attributes and functionality of the system being designed. Once the designer is satisfied with the design of the graphical model, the graphical model frequently serves as the basis for code generation in a target language with the code being used to construct the physical system represented by the graphical model. An example of this process is the conversion of graphical models into VHDL, Verilog and other hardware description languages during the design of integrated circuits. The graphical model may first be converted into an intermediate representation (IR) of the graphical model before being converted into the target language.

Unfortunately, the conversion of graphical models directly into a target language, with or without first converting the graphical model into an IR, suffers from a number of drawbacks. It is frequently desirable to simulate the performance of the system before building the physical model. HDL (hardware description language) simulations and other target language simulations tend to run more slowly and require more resources than simulations in a graphical programming environment. Additionally, if an IR is being used to translate the graphical model into a target language, it would be desirable to validate the translation of the graphical model into the IR and simulate a graphical model based on the IR to make sure no undesirable behavioral changes have been introduced to the model during the translation process.

SUMMARY OF THE INVENTION

The illustrative embodiment of the present invention provides a mechanism for converting a graphical model of a system into an intermediate representation (IR) of the model, altering the IR, and then using the altered IR to create a new or updated graphical model of the system that may be viewed and simulated by a user. Once the user is satisfied with the alterations to the IR, the IR or the graphical model may be used to generate code in a target language to enable the building of the physical system being designed. The use of the altered IR to generate a new or updated graphical model allows a more efficient and customizable design and simulation process than is typically found by simulating code that has been converted to target languages. The generation of the graphical model based on the altered IR allows a user to visually inspect the changes to the system, and the simulation of the graphical model based on the altered IR allows corrective action to be taken to account for any undesirable changes that occurred during the transformation of the model.

In one aspect of the present invention, a method of transforming graphical models includes the step of providing a graphical model. The method further includes the step of converting the graphical model into an intermediate representation (IR). The IR is suitable for conversion to a target language. Additionally, the method alters the IR of the graphical model and converts the altered IR into a graphical model.

In another aspect of the present invention, a system for transforming graphical models, includes a graphical programming environment. The graphical programming environment includes a graphical model. The system also includes a first conversion process that converts the graphical model into an intermediate representation (IR). The IR is suitable for conversion to a target language. Additionally, the system includes a second conversion process. The second conversion process converts an altered version of the IR into a graphical model.

In one aspect of the present invention, a method of transforming graphical models includes the step of providing a graphical model in a first language The method also converts the graphical model into an intermediate representation (IR). The IR is suitable for conversion to a target language different than the source language. The method additionally converts the IR into a graphical model in the target language.

In one aspect of the present invention, a method of transforming graphical models includes the step of providing a graphical model in a first language. The method converts the graphical model into an intermediate representation (IR). The IR is suitable for conversion to a target language different than the source language. The method additionally converts the IR into a new graphical model in the first language and simulates the new graphical model. The method also converts the IR into a graphical model in the target language.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The computer-aided design of physical systems is an iterative process in which the designer frequently makes multiple revisions to the model before finalizing the model. The illustrative embodiment of the present invention allows these revisions to be made upon an intermediate representation (IR) of the graphical model and then converts the altered IR to a graphical model for review and simulation by the designer. The mechanism of altering the IR and then generating a new or updated graphical model based on the IR allows both the altering and review of the model to take place more efficiently and in a more customizable fashion than conventional methods of converting the graphical model into a final intended target language for review or simulation.

Figure 1A:
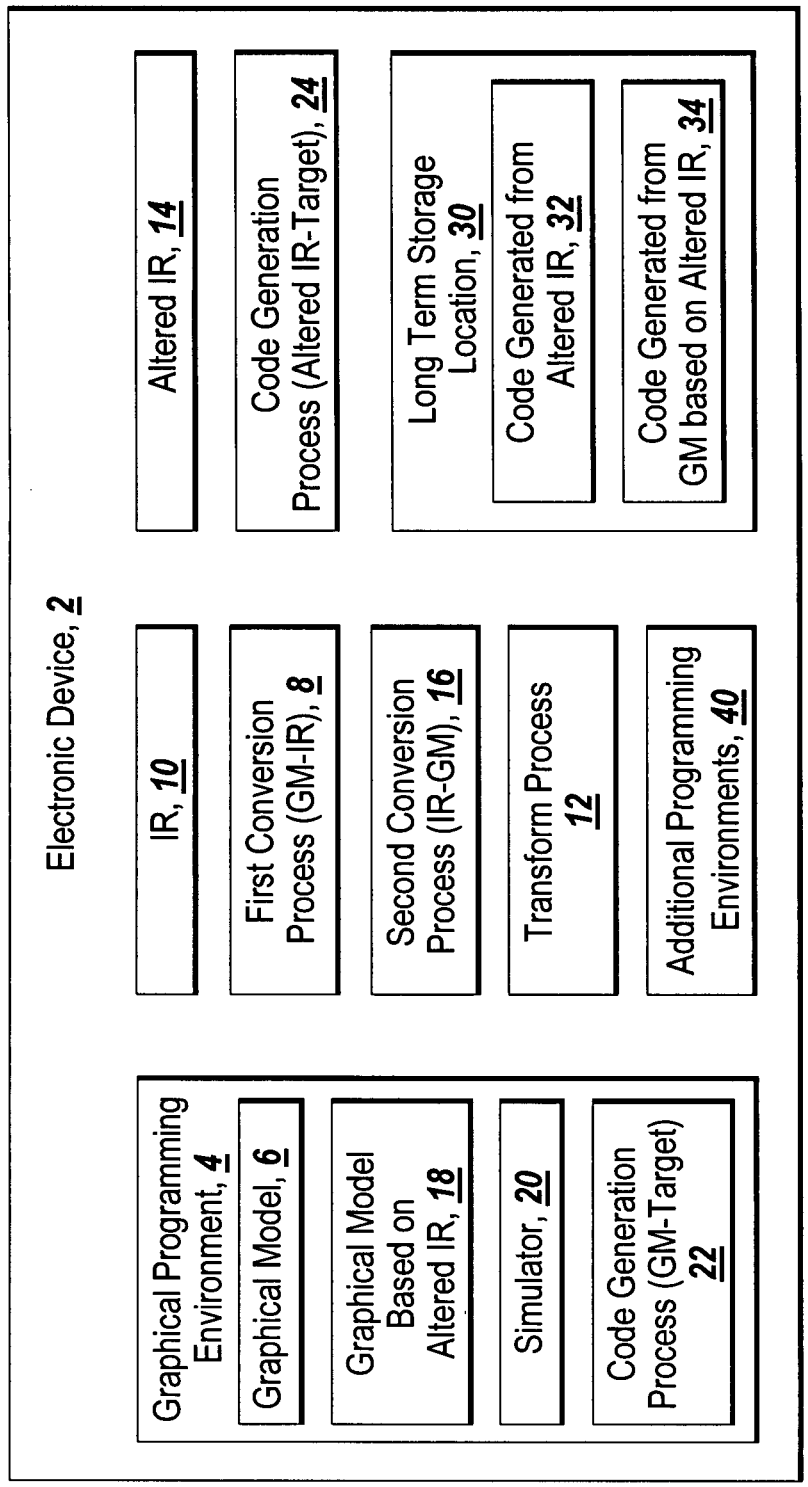
FIG. 1A depicts an environment suitable for practicing the illustrative embodiment of the present invention.

FIG. 1A depicts an environment suitable for practicing the illustrative embodiment of the present invention. An electronic device 2 hosts a graphical programming environment 4. The electronic device 2 may be a desktop, workstation, mainframe, server, laptop, PDA or some other electronic device equipped with a processor and capable of hosting the graphical programming environment 4. The graphical programming environment 4 may be a block diagram environment such as Simulink from The MathWorks, Inc. of Natick, Mass., a statechart environment such as Stateflow from The MathWorks, Inc. or a graphical circuit design environment such as Design Architect from Mentor Graphics Corporation of Wilsonville, Oreg. The graphical programming environment 4 includes a graphical model 6 such as a statechart, block diagram or electric circuit diagram. Alternatively, the graphical model could be a model of a mechanical or biological system. A first conversion process 8 on the electronic device 2 is used to create an IR 10 of the graphical model 6. The IR 10 is a memory capture of the graphical model 6 and may be stored as a graph with nodes and edges.

A transform process 12 on the electronic device 2 may be used to perform transforms that alter the IR 10. The IR 10 may also be exposed to additional programming environments 40 such as MATLAB from The MathWorks, Inc. or LABVEW from National Instruments of Corporation of Austin, Tex. The alteration of the IR 10 is discussed in further detail below. A second conversion process 16 is used to convert the altered IR 14 into a graphical model that is generated from the altered IR 18. Those skilled in the art will recognize that first conversion process 8 that is used to convert the graphical model 6 into the IR 10 and the second conversion process 16 that is used to convert the altered IR 14 into the graphical model generated from the altered IR 18 may be part of the same software tool.

The graphical model that is generated from the altered IR 18 may be a new graphical model or an update of the graphical model 6 that was originally used as the basis for the IR 10. The graphical model that is generated from the altered IR 18 may be displayed and visually inspected by a user. Additionally, the graphical programming environment 4 may include a simulator 20 that may be used to simulate the operation of the physical system being modeled. A user may review the simulation to ensure the translation of the graphical model 6 into the IR did not adversely affect the system behavior and that the alterations/transformations to the IR 10 resulted in an intended result.

Once the designer is satisfied with the look and performance of the graphical model generated from the altered IR 18, the graphical model generated from the altered IR may be translated by a code generation process 22 into code in a target language such as VHDL, Verilog, SystemC, C, C++, Java or M code that is used in the construction of the physical system. Alternatively, a different code generation process 24 may used to translate the altered IR 14 directly into code in the target language. A long term storage location 30 on the electronic device 2 or accessible to the electronic device 2 may be used to store the code generated from the altered IR 32 or the code generated from the graphical model based on the altered IR 34.

Figure 1B:
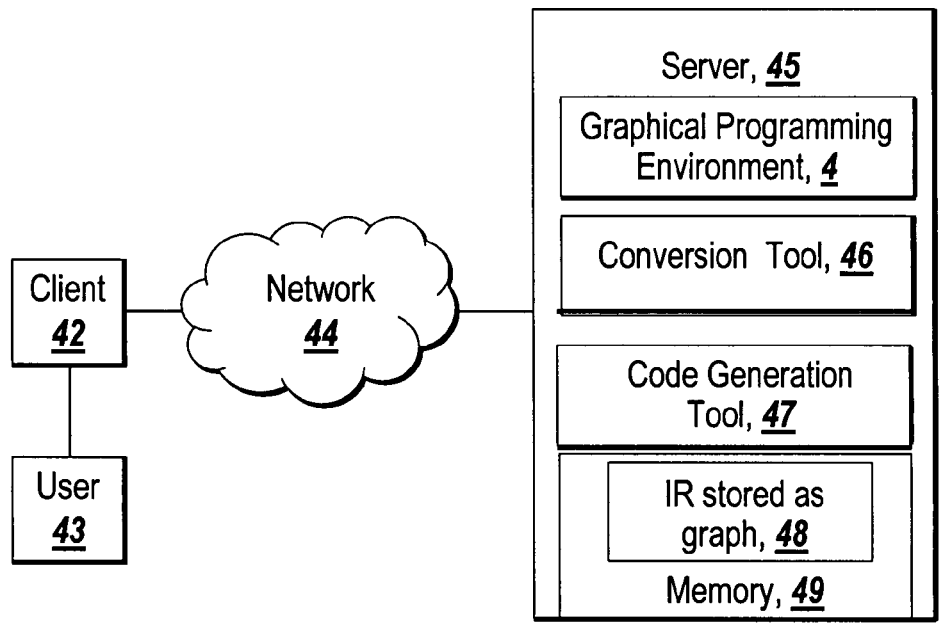
FIG. 1B depicts an alternate distributed environment suitable for practicing the illustrative embodiment of the present invention.

Although all of the components of the present invention discussed in reference to FIG. 1A have been depicted as being located on a single electronic device 2, it will be appreciated by those skilled in the art that other implementations are also possible within the scope of the present invention. For example, one or more of the graphical programming environment 4, the additional programming environments 40, the conversion processes 8 and 16, code generation processes 22 and 24 and the long term storage location 30 may be in communication over a network from different physical locations. FIG. 1B depicts an example of an alternative distributed environment suitable for practicing the illustrative embodiment of the present invention. A client system 42 that is being accessed by a user 43 communicates over a network 44 with a server 45. The network 44 may be the Internet, a local area network (LAN), wide area network (WAN) or some other type of network. The server hosts the graphical programming environment 4 of the present invention and a conversion software tool 46 combining the first and second conversion processes discussed in FIG. 1A above. Similarly, the server 45 hosts a code generation software tool 47 combining the first and second code generation processes discussed in FIG. 1A above. The server 45 may store the IR as a graph 48 in memory 49. The user 43 enters commands at the client and receives output from the processing of the graphical model that is taking place on server 45.

Figure 2:
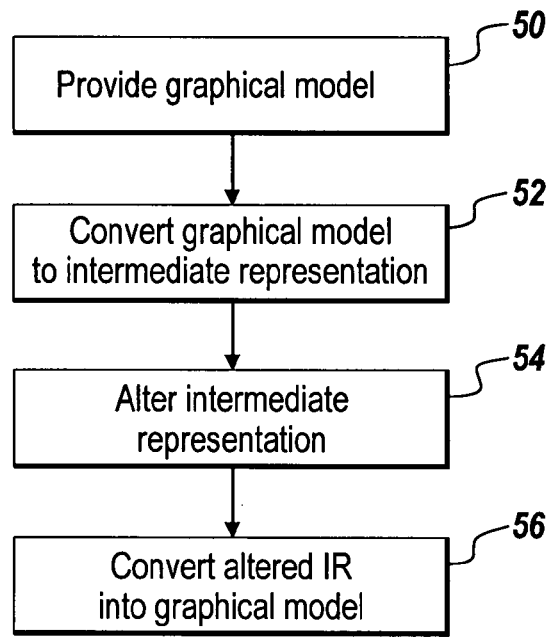
FIG. 2 is a flowchart of the sequence of steps followed by the illustrative embodiment of the present invention to convert a graphical model into an IR (intermediate representation) of the graphical model, alter the IR and convert the altered IR back into graphical model.

The overall sequence of steps followed by the illustrative embodiment of the present invention in order to create a new or updated graphical model 18 based on an altered IR 14 is depicted in FIG. 2. The sequence begins with the provision of graphical model 6 such as a system model (step 50). The graphical model 6 is then converted into an IR 10 of the graphical model (step 52). The process by which the graphical model 6 is converted into the IR 10 is discussed further below. Once the IR 10 is created, a number of types of well-know transforms may be performed on the IR to produce an altered IR representation 14 (step 54). For example, the transforms may be lowering transforms, elaboration transforms or optimization transforms. The alteration of the IR may take place by exposing the IR 10 to another programming environment 40. The altered IR 14 is then converted into a new or updated graphical model 18 (step 56). In an aspect of the illustrative embodiment, following the altering of the IR 10, the second conversion process 16 generates a set of modifications that are applied to the original graphical model 6 rather than creating a new graphical model.

The first conversion process 8 receives the graphical model 6 written in a source language and translates the file into an IR 10. The IR 10 of the present invention is usually, although not required to be, in a source and target language independent format, such that data contained within the IR is not specific to the source language from which it was generated. The data contained within the IR 10 may be used for subsequent code generation and the eventual generation of a representation of the data using a target language.

The first conversion process 8 is capable of converting a source language of one of a variety of types into one or more intermediate representations, such that various system models can be used to describe individual behaviors of the modeled system using the most applicable language for the desired results. The first conversion process 8 of the present invention is therefore capable of translating these various source languages into a single IR 10 for use in conversion into the target language.

The translation of the source language of the graphical model 6 to the IR 10 can be completed using numerous means recognized by those skilled in the art. One suitable example is the Real-Time Workshop® (RTW) coder, offered by The MathWorks, Inc. Using the RTW coder the source language of the graphical model 6 is analyzed and converted into an IR 10 wherein the file contained within the IR is in a source and target language independent format. The RTW coder, or other suitable process, walks the graphical model data structures, retrieves the records and generates the IR This intermediate model file includes a hierarchical structure of records describing systems and their blocks and connections analyzed from a block diagram model of the source file. One skilled in the art will readily conceive how to construct such records from the data structures of the graphical model. The use of the RTW coder is a representative example, and those skilled in the art will readily recognize that the intermediate representation can be generated using numerous coding mechanisms for processing serial and parallel source languages.

Once the IR 10, which can vary in its degree of abstraction from the graphical model, has been created from the graphical model 6, the present invention allows the IR to be altered as part of the system design process. The altered IR 14 serves as the basis for a new or updated graphical model 18. The designer is able to view and/or simulate the new or updated graphical model 18 to verify the behavior of the system model. The illustrative embodiment exposes the manner in which the IR is altered which allows the customization of the process by the system designer. For example, the designer is able to plug in a transform from a design environment or substitute a vendor library containing a different transform. The designer can change the operations based on the result of each design iteration. As an example, a SIMULINK block diagram model may changed to an IR, altered and changed back to a new SIMULINK model. Following simulation, the process may be repeated in the event of an unwanted result with an alteration to the new model or a replacement alteration to the original model with the process being repeated as many times as necessary.

Figure 3:
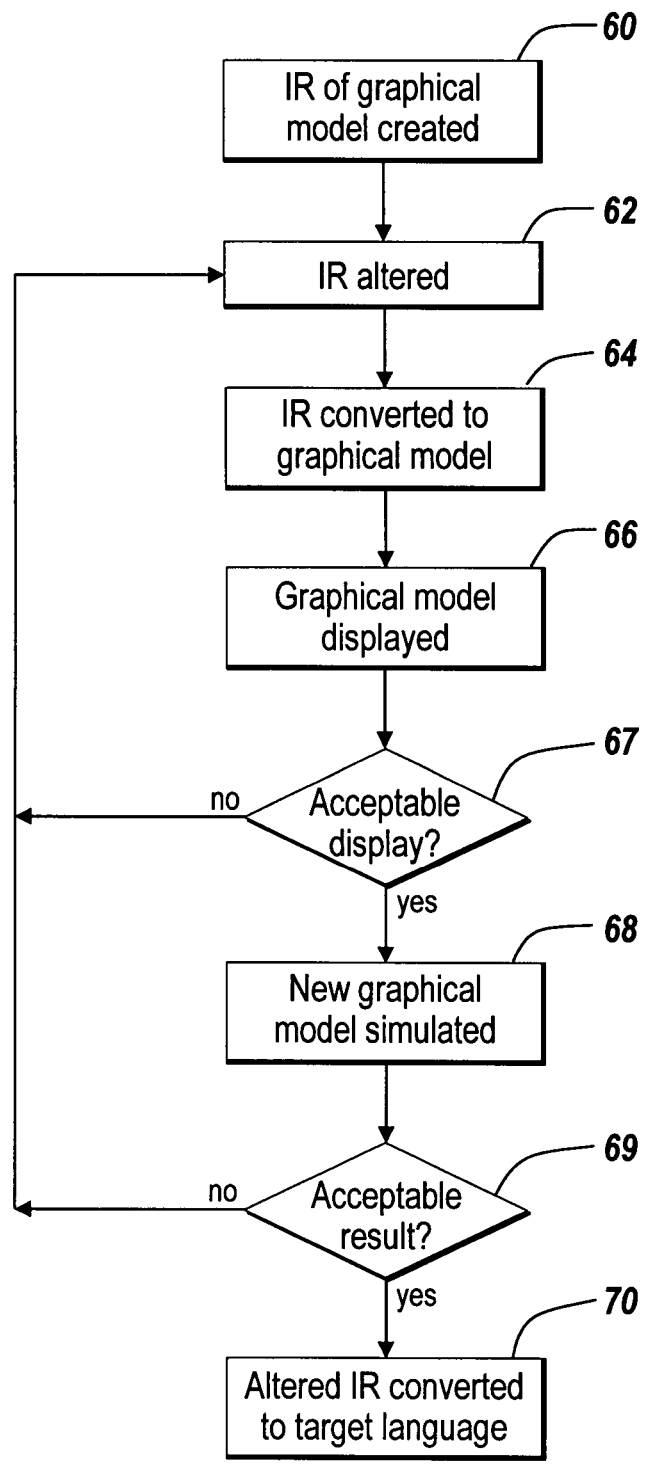
FIG. 3 is a flowchart of the sequence of steps followed by the illustrative embodiment of the present invention to iteratively alter an IR until a graphical model satisfactory to a user is generated.

FIG. 3 depicts the iterative sequence of steps that may be followed by the present invention to allow the designer to produce an acceptable system model prior to the translation of the system model (or its IR) into a target language needed to produce the physical system. The sequence begins with the creation of the IR 10 based on the graphical model 6 (step 60). The IR 10 is then altered such as by applying a transform operation to the IR (step 62). The altered IR 14 is then converted to a graphical model 18 (step 64). In implementations using the Real-Time Workshop© coder discussed above, the RTW coder converts the IR back into a graphical model such as a Simulink model by examining the created hierarchical structure of records in the IR that describe systems and their blocks and connections. The information is used to create or update a block diagram model from the altered IR. The created/updated graphical model based on the altered IR 18 is then displayed to the system designer (step 66). The illustrative embodiment thus provides the designer the opportunity to visually inspect changes to the system model that were made to the IR, prior to the translation of the system model to a target language.

If the display of the system model depicted in the graphical model based on the altered IR 18 reveals an unacceptable change to the designer (step 67), the process iterates and the designer may alter the IR 10 or further alter the previously altered IR 14 (step 62). If the visual inspection is acceptable to the designer (step 67) the designer may then cause the graphical programming environment 4 to simulate the graphical model based on the altered IR 18 (step 68). The illustrative embodiment thus also provides the system designer the opportunity to inspect the results of the simulation of the system model following changes to the IR, prior to the translation of the system model to a target language. If the simulation results are not acceptable to the system designer, the process iterates and the designer may alter the IR 10 or further alter the previously altered IR 14 (step 62). If the changes are acceptable to the system designer after observing the simulation results, the target language code may be generated (step 70), either by the code generation process 22 generating the target language code from the graphical model based on the altered IR 18 or the code generation process 24 generating the target code directly from the altered IR 14.

It will be appreciated, that the actual sequence of steps followed to utilize the IR may vary from that shown in FIG. 3 while still remaining within the scope of the present invention. For example, following the creation of the IR and display of the graphical model based on the IR(steps 62 and 64), the user may decide (step 67) to create a new graphical model (step 60)rather than altering the IR (step 62). Alternatively, the user may choose to alter the way the IR is converted into a graphical model (step 64) rather than altering the actual IR (step 62). These and similar alternatives are expressly considered to be within the scope of the present invention.

Figure 4A:
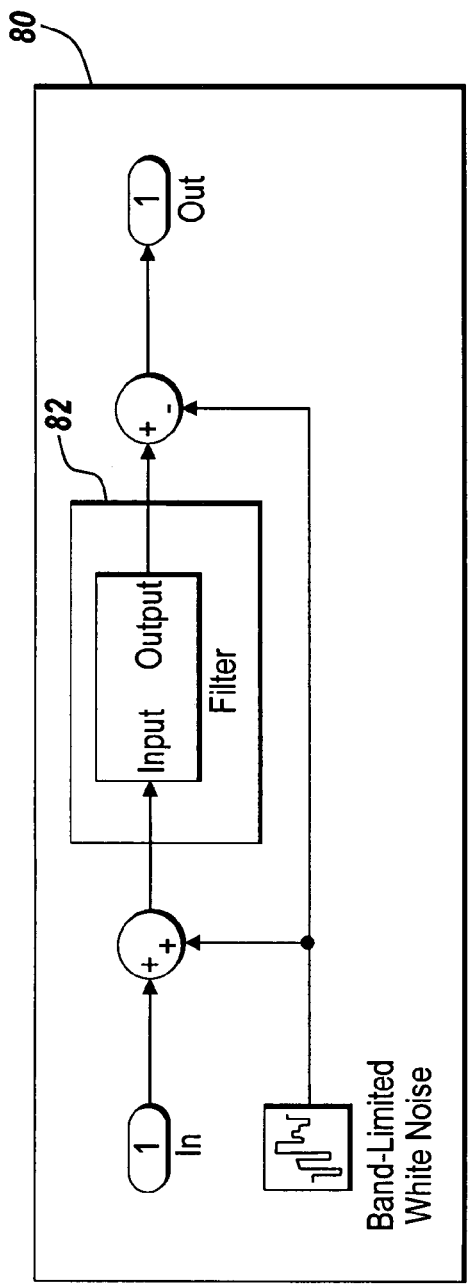
FIG. 4A is block diagram of a system.
Figure 4B:
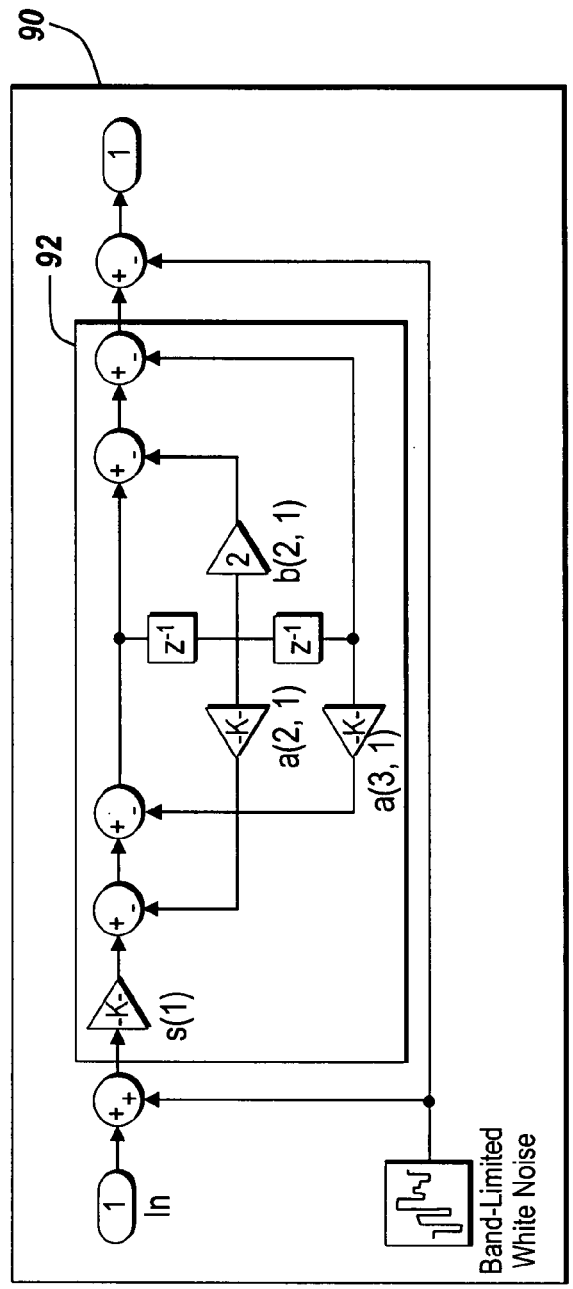
FIG. 4B is a block diagram of the system of FIG. 4A following alteration to an IR based on the system.

The altering of the IR 10 may take many forms and may result in behavioral changes in the model such as numerical or latency changes. Alternatively, the alteration of the IR may preserve the numerical and timing characteristics of the original model resulting in no behavioral changes. FIGS. 4A and 4B depict the effects of the application of a transform to a portion of an IR 10 of a system. FIG. 4A depicts a system 80 prior to the application of the transform. The system 80 includes a filter 82. A lowering transform (which lowers the level of abstraction), is applied to the IR 10 of the system, specifically to the portion of the IR representing the filter 82. The lowering transform breaks down the complicated operation of the filter 82 into simpler operations. Following the application of a lowering transform to the filter 82 in the IR 10, the altered IR 14 is converted into a graphical model based on the altered IR 18, specifically the system 90 represented in FIG. 4B. The application of the lowering transform to the IR creates a simplified system 90, wherein the filter 82 has been replaced by a series of simpler functions 92. Those skilled in the art will recognize that there exist numerous other applicable transforms (such as optimization and elaboration transforms) for use with the current invention.

Figure 5A:
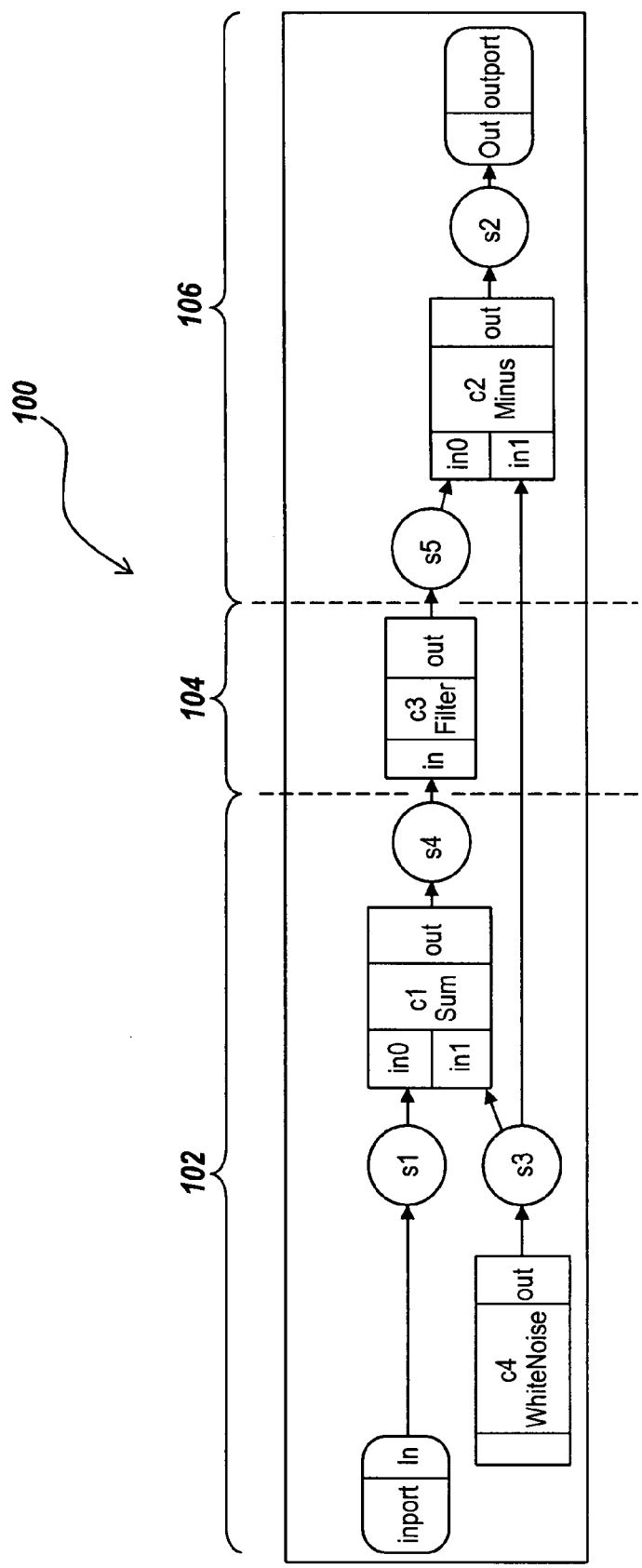
FIG. 5A depicts an IR representation for the block diagram of FIG. 4A.
Figure 5B:
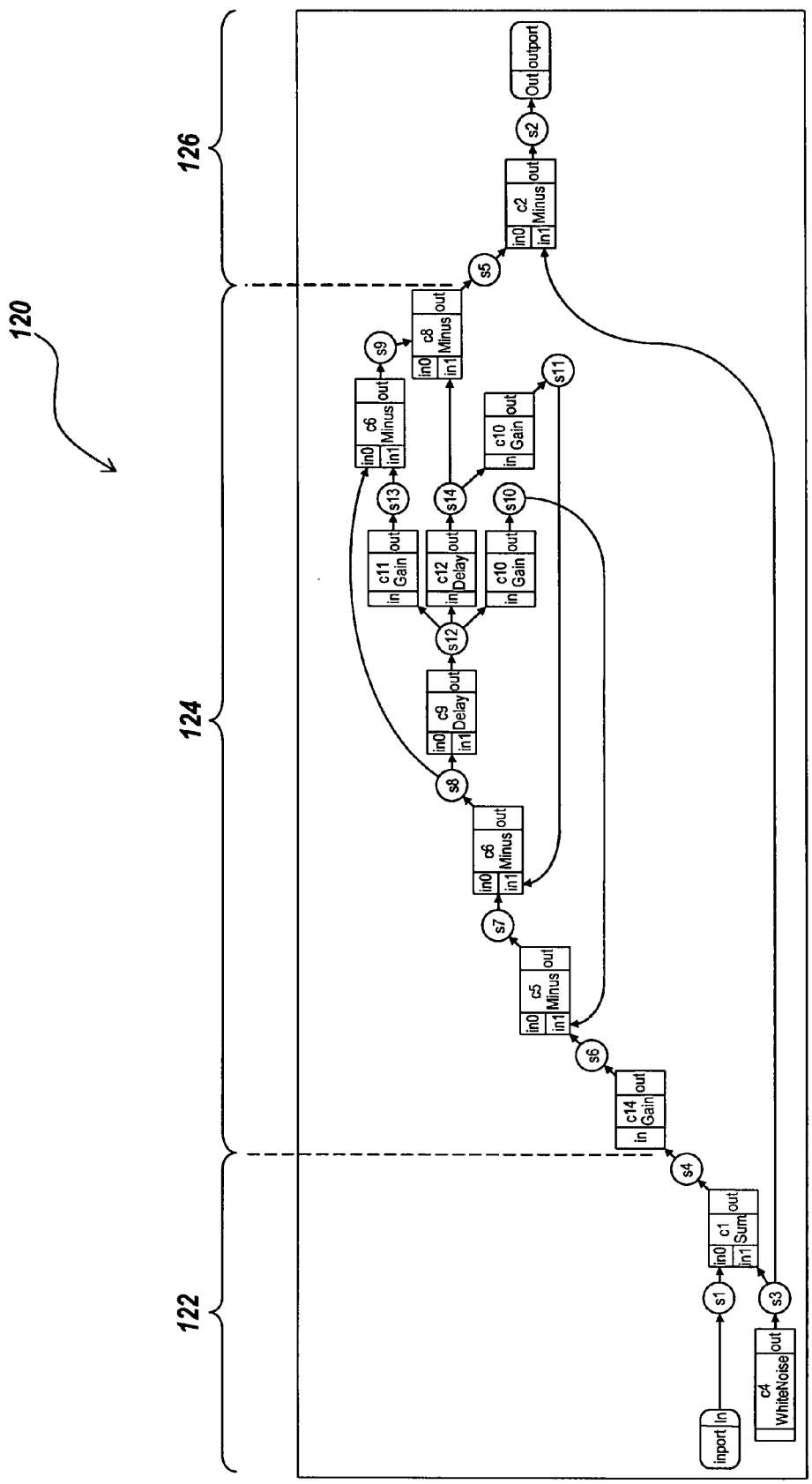
FIG. 5B depicts an IR representation for the block diagram of FIG. 4B.

FIGS. 5A and 5B are IRs of the graphical models depicted in FIGS. 4A and 4B respectively. FIG. 5A shows an IR 100 for the system 80 depicted in FIG. 4A. Following the application of a lowering transform to the IR 100 of the system 80, the IR 120 of FIG. 5B is produced. FIG. 5B includes sections 122 and 126 which directly correspond to sections 102 and 106 of FIG. 5A. The lowering transform has been applied to section 104 of the IR 100 in FIG. 5A to produce section 124 of FIG. 5B. Section 104 of the IR 100 in FIG. 5A (the section to which the lowering transform is applied) corresponds to the filter 82 depicted in FIG. 4A. The IR 120 in FIG. 5B may then be used to regenerate the graphical model of the system 90 depicted in FIG. 4B where the expanded filter 92 corresponds to section 124 in FIG. 5B.

In one aspect of the illustrative embodiment, the IR 10 is exposed to additional programming environments 40 such as MATLAB. The additional programming environments may allow extensibility of the transformations, vendor-specific optimizations, metrics and predictions. In another aspect of the illustrative embodiment, the transformations may be dictated by one or more user-specified configuration sets that include changes that change numerical or timing behaviors of the modeled systems. Thus the transformation may be performed by a plug-in process supplied by a vendor or a user. Alternatively, the transformation may be manually controlled and dictated by a user.

The code generation processes 22 and 24 may translate the altered IR 10 (or the graphical model based on the altered IR 18) into the intended target language. For illustrative purposes, a single code generation process 22 or 24 have been shown resulting in a single collection of code generated from the altered IR 32 (or code generated from the graphical model based on the altered IR 34). It will be appreciated that the code generation processes 22 and 24 are capable of generating multiple graphical or textual programs written in a desired target language. It will be appreciated that a graphical model target language will usually be different than the original source language. The generated target file(s) can further be used to fabricate an electronic circuit using automated microprocessor manufacturing techniques understood by those skilled in the art. In another aspect of the illustrative embodiment, the code generation processes 22 and/or 24 may output a target language in C or C++ format. The target language can then be used with an external compiler to generate executable code as required.

The illustrative embodiment of the present invention may also provide configurable control over access to the IR. The type of operations performed on the IR and the threshold issue of access to the IR may be set by an administrator or other authorized individual. The limitation of access to the IR can be used to impose restraints on members of the development team during the design process.

Although the examples contained herein have been made with reference to a graphical modeling environment, it should be appreciated that the illustrative embodiment of the present invention may be practiced in the absence of a graphical modeling environment. Thus, a program may read a graphical model file, construct an IR, and then generate an output file without the graphical model being displayed in a graphical modeling environment.

Similarly, it should be appreciated that although many of the examples contained herein have discussed the alteration of the IR, the present invention may be practiced without altering the generated IR. For example, the generation of the IR provides a user an opportunity to view the model data and structure in a different form before the generation of an output model in a different language, an option that may prove useful to the user even without any alteration of the IR. Additionally, the generation of an output model in such a scenario may be easier from the IR format than generating the output model directly from the graphical model.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method comprising:
receiving a first graphical model representing a dynamic system and a configuration set for the first graphical model, where:
the configuration set includes a user-specified change to be performed on the first graphical model,
the user-specified change changes a numerical or timing behavior of the first graphical model,
the user-specified change includes:
adding or removing one or more graphical elements to/from the first graphical model; or
modifying one or more parameters associated with the first graphical model;
converting the first graphical model into an intermediate representation (IR);
altering the IR based on the user-specified change included in the configuration set, where:
the altering generates an altered IR,
the altered IR represents the dynamic system with the user-specified change;
generating a second graphical model based on the altered IR and the configuration set; and
generating code in a target language, the code in the target language generated from the second graphical model.

2. The method of claim 1 further comprising:
altering the IR two or more times prior to generating the second graphical model.

3. The method of claim 1 wherein the altering includes:
applying one or more transform operations to the IR.

4. The method of claim 1 wherein the altered IR has a hierarchical structure of records that describe one or more blocks of the first graphical model and one or more connections among the one or more blocks, and the generating the second graphical model includes:
examining the hierarchical structure of records of the altered IR.

5. The method of claim 1 wherein the first graphical model is in a source language that differs from the target language of the generated code.

6. The method of claim 1 wherein the first graphical model is one of a statechart, a block diagram or a circuit design.

7. The method of claim 1 further comprising:
receiving one or more modifications to the IR or the altered IR in response to detecting an unacceptable change between the first graphical model and the second graphical model.

8. A method comprising:
receiving a first graphical model representing a dynamic system and a configuration set, where:
the configuration set includes a plurality of user-specified parameters to be applied to one or more graphical elements of the first graphical model, the plurality of parameters specify a plurality of behaviors for the one or more graphical elements of the first graphical model;
converting the first graphical model into an intermediate representation (IR);
applying a transform operation to the IR to alter the IR, where:
the applying generates an altered IR,
the transform operation being controlled by the plurality of parameters,
the altered IR represents the dynamic system with a change in a behavior as specified by one or more of the plurality of parameters;
generating a second graphical model from the altered IR; and
generating code in a target language, the code in the target language generated from either the altered IR or the second graphical model.

9. A non-transitory computer-readable memory medium storing program instructions that, when executed by a computer, cause the computer to:
receive a first graphical model that models a system and a configuration set, where:
the configuration set includes a user-specified change to be performed on the first graphical model,
the user-specified change changes a behavior of the first graphical model,
the user-specified change includes:
adding or removing one or more graphical elements to/from the first graphical model; or
modifying one or more parameters associated with the first graphical model;
convert the first graphical model into a first intermediate representation (IR);
apply a transform operation to the first IR to alter the first IR, where:
the applying generates an altered IR,
the transform operation is controlled by the configuration set,
the altered first IR represents the system with the user-specified change;
generate one or more modifications based on the altered first IR;
apply the one or more generated modifications to the first graphical model to produce a second graphical model that models the system;
receive from the user one or more modifications to the second graphical model to produce a third graphical model;
convert the third graphical model into a second IR suitable for conversion to a target language; and
generate code in the target language, the code in the target language generated from either the third graphical model or the second IR.

10. The computer-readable memory medium of claim 9 wherein the transform operation includes one or more operations selected from the group consisting of an elaboration transform operation, a lowering transform operation, and an optimization transform operation.

11. The computer-readable memory medium of claim 9 further storing program instructions to:
simulate operation of the system modeled by the second graphical model.

12. The computer-readable memory medium of claim 9 wherein the first graphical model is one of a statechart, a block diagram or a circuit design.

13. An apparatus for validating a graphical model, the apparatus comprising:
means for receiving a first graphical model representing a dynamic system and a configuration set, where:
the configuration set includes a user-specified change to be performed on the first graphical model,
the user-specified change changes a behavior of the first graphical model,
the user-specified change includes:
adding or removing one or more graphical elements to/from the first graphical model; or
modifying one or more parameters associated with the first graphical model, and
the first graphical model includes multiple source languages;
means for converting the first graphical model into a single intermediate representation (IR), the single IR suitable for conversion to a target language;
means for altering the IR of the first graphical model based on the user-specified change included in the configuration set, where the altered IR represents the dynamic system with the user-specified change;
means for converting the altered IR into a second graphical model; and
means for displaying the second graphical model to a user for validation.

14. The apparatus of claim 13 further comprising means for generating code in a target language from either the second graphical model or the altered IR.

15. The apparatus of claim 13 wherein the first and second graphical models each model a physical system, and the apparatus further comprises means for simulating operation of the physical system modeled by one or more of the first and the second graphical models.

16. The apparatus of claim 15 wherein the first and second graphical models each have at least one behavior, and the at least one behavior of the first graphical model differs from the at least one behavior of the second graphical model.

17. The apparatus of claim 16 wherein the difference in the at least one behavior of the first and second graphical models is either a numerical difference or a latency difference.

18. A system comprising:
a processor for:
receiving a first graphical model representing a dynamic system in one or more source languages and a configuration set from a user, where:
the configuration set includes a user-specified change to be performed on the first graphical model,
the user-specified change changes a behavior of the first graphical model,
the user-specified change includes:
adding or removing one or more graphical elements to/from the first graphical model; or
modifying one or more parameters associated with the first graphical model,
converting the first graphical model into an intermediate representation (IR) that is suitable for conversion to a target language and that is independent of the one or more source languages,
applying one or more transform operations to the IR to produce an altered IR, the one or more transform operations being controlled by the configuration set, where the altered IR represents the dynamic system with the user-specified change,
converting the altered IR into a second graphical model for display to the user, and generating in the target language, the code in the target language generated code from either the second graphical model or the altered IR.

19. The system of claim 18 wherein the first and second graphical models each model a physical system, and the processor further simulates an operation of the physical system modeled by the first or the second graphical model.

20. The system of claim 18 wherein the one or more transform operations is selected from the group consisting of an elaboration operation, a lowering operation and an optimization operation.

21. The system of claim 18 wherein the target language is with one of Verilog, VHDL, SystemC, C, C++, Java or M code.

22. The system of claim 18 wherein the first graphical model is one of a statechart, a block diagram or a circuit design.

23. The system of claim 18 wherein the second graphical model differs from the first graphical model.

24. The system of claim 18 wherein the processor is further for:
receiving one or more modifications to the second graphical model in response to detecting an unacceptable change between the first graphical model and the second graphical model.

* * * * *

UNITED STATES PATENT AND TRADEMARK OFFICE
CERTIFICATE OF CORRECTION

PATENT NO. : 8,589,870 B2  
APPLICATION NO. : 11/879322  
DATED : November 19, 2013  
INVENTOR(S) : Brian K. Ogilvie et al.

Page 1 of 1

It is certified that error appears in the above-identified patent and that said Letters Patent is hereby corrected as shown below:

On the Title Page of the Patent, the Assignee (73) should read as follows:

"The MathWorks, Inc. Natick, MA"

Signed and Sealed this  
Second Day of December, 2014

Michelle K. Lee  
*Deputy Director of the United States Patent and Trademark Office*